US009230215B2

(12) United States Patent
Christophe et al.

(10) Patent No.: US 9,230,215 B2
(45) Date of Patent: Jan. 5, 2016

(54) ONTOLOGICAL CONCEPT EXPANSION

(71) Applicant: Alcatel-Lucent, Paris (FR)

(72) Inventors: Benoit Christophe, Massy (FR); Mathieu Boussard, Chailly-en-Bière (FR)

(73) Assignee: Alcatel Lucent, Boulogne-Billancourt (FR)

( * ) Notice: Subject to any disclaimer, the term of this patent is extended or adjusted under 35 U.S.C. 154(b) by 274 days.

(21) Appl. No.: 13/869,364

(22) Filed: Apr. 24, 2013

(65) Prior Publication Data
US 2014/0324750 A1    Oct. 30, 2014

(51) Int. Cl.
| | |
|---|---|
| G06K 9/72 | (2006.01) |
| G06N 3/08 | (2006.01) |
| G06N 5/00 | (2006.01) |
| G06N 5/02 | (2006.01) |
| G06N 99/00 | (2010.01) |
| G06F 17/30 | (2006.01) |
| H04L 29/08 | (2006.01) |
| G06K 9/00 | (2006.01) |

(52) U.S. Cl.
CPC ............ *G06N 5/022* (2013.01); *G06F 17/3074* (2013.01); *G06F 17/30707* (2013.01); *G06F 17/30908* (2013.01); *G06F 17/30914* (2013.01); *G06K 9/00718* (2013.01); *G06K 9/72* (2013.01); *G06N 5/02* (2013.01); *G06N 99/005* (2013.01); *H04L 29/08756* (2013.01)

(58) Field of Classification Search
USPC ...................................................... 706/20, 46
See application file for complete search history.

(56) References Cited

PUBLICATIONS

Jiang et al., Ontology Enhancement and Concept Granularity Learning: Keeping Yourself Current and Adaptive, KDD'11 San Diego, California, USA [online], Aug. 21-24, 2011 [retrieved on Mar. 9, 2015]. Retrieved from the Internet:<URL:http://dl.acm.org/ft_gateway.cfm?id=2020597&ftid=1013037&dwn=1&CFID=484523024&CFTOKEN=37047088>.*
Baader, Franz et al., "Computing Least Common Subsumers in Description Logics with Existential Restrictions," IJCAI '99 Proceedings of the Sixteenth International Joint Conference on Artificial Intelligence, Jul. 1999, pp. 96-101.
d'Amato, Claudia et al., "A Dissimilarity Measure for ALC Concept Descriptions," Proceedings of the 2006 ACM Symposium on Applied Computing, Apr. 23-27, 2006, Dijon, France, pp. 1695-1699.
Wu, Zhibiao et al., "Verb Semantics and Lexical Selection," ACL '94 Proceedings of the 32nd Annual Meeting on Association for Computational Linguistics, 1994, pp. 133-138.

* cited by examiner

*Primary Examiner* — Jeffrey A Gaffin
*Assistant Examiner* — Nathan Brown, Jr.
(74) *Attorney, Agent, or Firm* — Mendelsohn, Drucker & Dunleavy, P.C.; Steve Mendelsohn

(57) ABSTRACT

In one embodiment, prior to similarity measure computation, concept expansion based on disjunctive normal form (DNF) decomposition and non-conventional reasoning is applied to an original ontology to generate an expanded ontology having the original concepts plus one or more pseudo concepts. As a result, the similarity measure computation can produce results that more accurately reflect a human point of view than convention techniques.

21 Claims, 9 Drawing Sheets

FIG. 1

| NAME | SYNTAX | DL LABEL |
|---|---|---|
| ATOMIC CONCEPT | $A$ | $AL$ |
| ATOMIC NEGATION | $\neg A$ | $AL$ |
| TOP CONCEPT | $\top$ | $AL$ |
| BOTTOM CONCEPT | $\bot$ | $AL$ |
| INTERSECTION | $C \sqcap D$ | $AL$ |
| QUALIFIED VALUE RESTRICTION | $\forall R.C$ | $AL$ |
| LIMITED EXISTENTIAL QUALIFICATION | $\exists R.\top$ | $AL$ |
| UNION | $C \sqcup D$ | $U$ |
| FULL EXISTENTIAL QUALIFICATION | $\exists R.C$ | $E$ |
| COMPLEX CONCEPT NEGATION | $\neg C$ | $C$ |
| CARDINAL RESTRICTIONS | $\geq nR.\top, \leq nR.\top, = nR.\top$ | $N$ |
| QUALIFIED CARDINAL RESTRICTIONS | $\geq nR.C, \leq nR.C, = nR.C$ | $Q$ |
| ROLE HIERARCHY | $R \sqsubseteq S$ | $H$ |
| INVERSE ROLES | $R^-$ | $I$ |
| TRANSITIVE ROLES | $R \in N_R^+$ | $S$ |

FIG. 7

```
1   //in pseudo concept manager
2   init:
3     O←HermiT.readOntology(Ontology);   // get a representation of the original ontology
4     LIBS[]←get_reasoning_rules(configuration_file);   // get reasoning rule libraries to call 5   proc generate_pseudo_concepts(KB)
6   {
7     for lib in LIBS[] do
8     {
9       PS[]←plugin.call(lib,O);
10      if PS[]<>null then
11      {
12        for PS in PS[] do
13        {
14          O←HermiT.add_concept(O,PS);   //add pseudo concepts in ontology representation
15        }
16      }
17    }
18  }

19  // in plugin manager
20  proc call(lib,O)
21  {
22    return lib.generate_concepts(O);   // ask a library to generate pseudo concepts
23  }
```

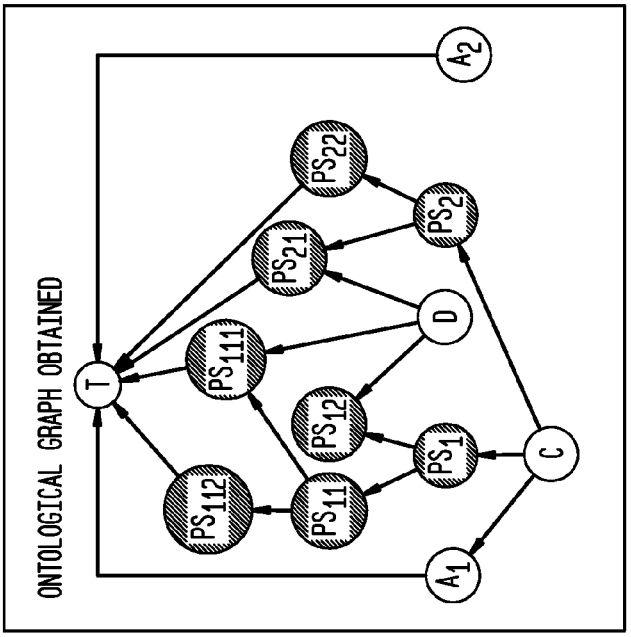
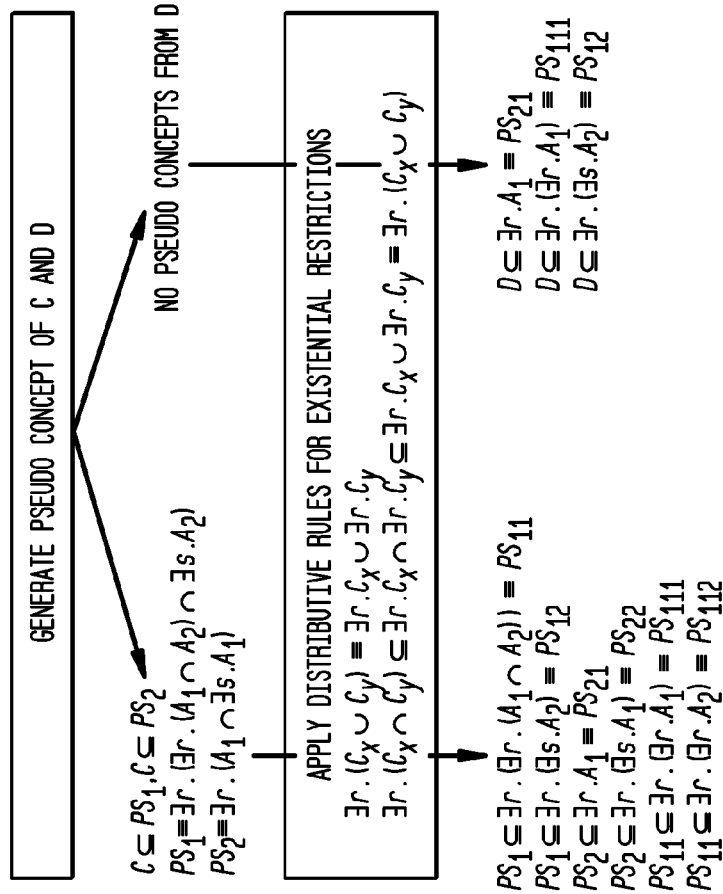
FIG. 9

FIG. 10

$OneChildParent \equiv \forall hasChild.Child \sqcap (=1hasChild.Child)$
$Mary:Girl; Sally:Girl$
$John:OneChildParent; Suzy:OneChildParent$
$hasChild(John,Mary); hasChild(Suzy,Sally)$

↓

Apply CWA reasoning to generate «one of» classes
$X \equiv \forall r.Y \sqcap (=1r.Y) \wedge \forall z_j:Z, \exists x:X/r(x,z)$ $z:Y \wedge Z \equiv \{z_j\} \wedge Z \subseteq Y$

↓

$Mary:Child, Sally:Child$ $Child \equiv \{Mary, Sally\}$
$Girl \subseteq Child$

▨ Extra reasoning based on CWA assumption (all childs are either Mary or Sally):
«Girl» is equivalent to 2 individuals AND is now a subclass of «Child»

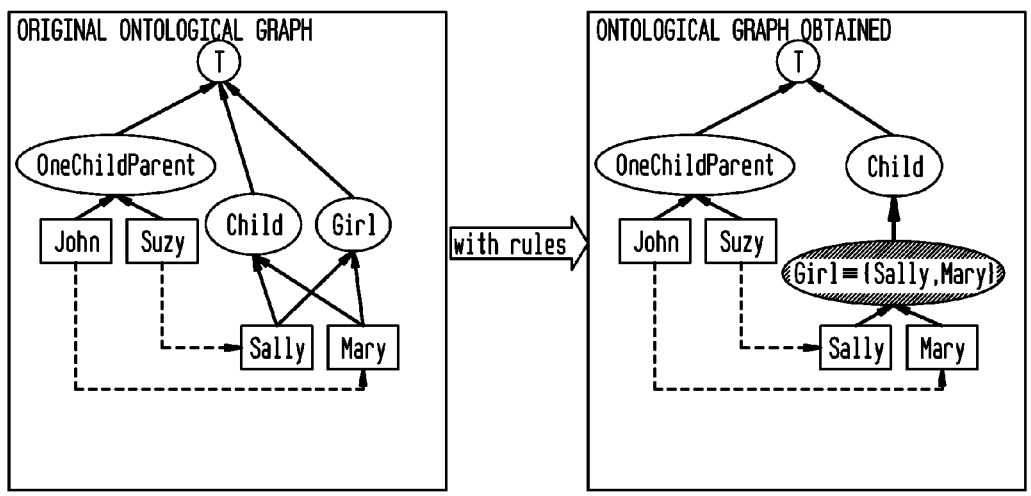

ONTOLOGICAL CONCEPT EXPANSION

BACKGROUND

1. Field of the Invention

The present invention relates to computer network-based structured data and, more specifically but not exclusively, to semantic similarity measures for structured data.

2. Description of the Related Art

This section introduces aspects that may help facilitate a better understanding of the invention. Accordingly, the statements of this section are to be read in this light and are not to be understood as admissions about what is prior art or what is not prior art.

Data on a computer-based network, such as the World Wide Web, can be linked using structured meta-data. Structured data enables many applications to be developed and to interact using machine-readable and machine-understandable vocabularies. For instance, in the case of network management, structured data of different equipment can be compared to detect failure and to propose recovery solutions. In a banking context, so-called "structured big data" can represent banking transactions and user profiles that an analysis can turn into assets such as proposing targeted products or advertisements to customers.

In the context of data structured using Semantic Web principles, data is annotated by concepts and properties having been formally defined in an ontology, i.e., defined using logical constructors of a given description logic. The comparison of such semantically enriched structures is usually done by applying one or more similarity measures that attempt to characterize how different structures are similar or how they relate to each other. A plethora of similarity measures applied to ontological data have been designed that rely on different points of view to interpret data descriptions (e.g., based on the main concept that they embody, taking into account all their features, etc.).

The problem with existing similarly measures is that the methodology used to compute similarities may easily lead to poor results when complex semantic descriptions are based on highly expressive description logics. In particular, either the similarity measures ignore most of the semantics (i.e., the logical constructs used to represent concepts and properties mapped on data) or they take such semantics into account too strongly, leading to weak similarity measurements for two concepts that would be considered close from a human point of view.

SUMMARY

This disclosure describes the design and implementation of a similarity-measurement process, taking into account all or most of the semantics of an expressive description logic, but without taking a too-strong approach when comparing formally defined concepts.

In one embodiment, the present invention is a machine-implemented method comprising (a) the machine receiving an original ontology containing a plurality of original concepts and (b) the machine applying a concept expansion mechanism to the original ontology to generate an expanded ontology containing the original concepts and one or more pseudo concepts.

BRIEF DESCRIPTION OF THE DRAWINGS

Other embodiments of the invention will become more fully apparent from the following detailed description, the appended claims, and the accompanying drawings in which similar or identical reference numerals identify similar or identical elements.

FIG. 1 shows a table of constructors of various description logics (DLs);

FIG. 7 presents pseudo code for one possible implementation of the pseudo concept manager and the plug-in manager of FIG. 6; and FIGS. 8-10 show block diagrams of exemplary implementations of different techniques for generating pseudo concepts.

DETAILED DESCRIPTION

FIG. 1 shows a table of constructors of various description logics (DLs). A label is usually associated with a DL, as shown in the last column in FIG. 1. The description logic SHIQ contains all of the logical constructors of FIG. 1.

An exemplary complex concept C is represented in Equation (1) as follows:

$$C \equiv A_1 \cup (A_2 \cap A_3) \cup (\exists S.A_4) \cap \geq 2T.A_5) \qquad (1)$$

The complex concept C is defined as the union of three different expressions. In these expressions, the $A_i$'s are atomic concepts, and the expression "$\geq 2T.\ A_5$" means "at least two properties T of type $A_5$."

Figure 2:
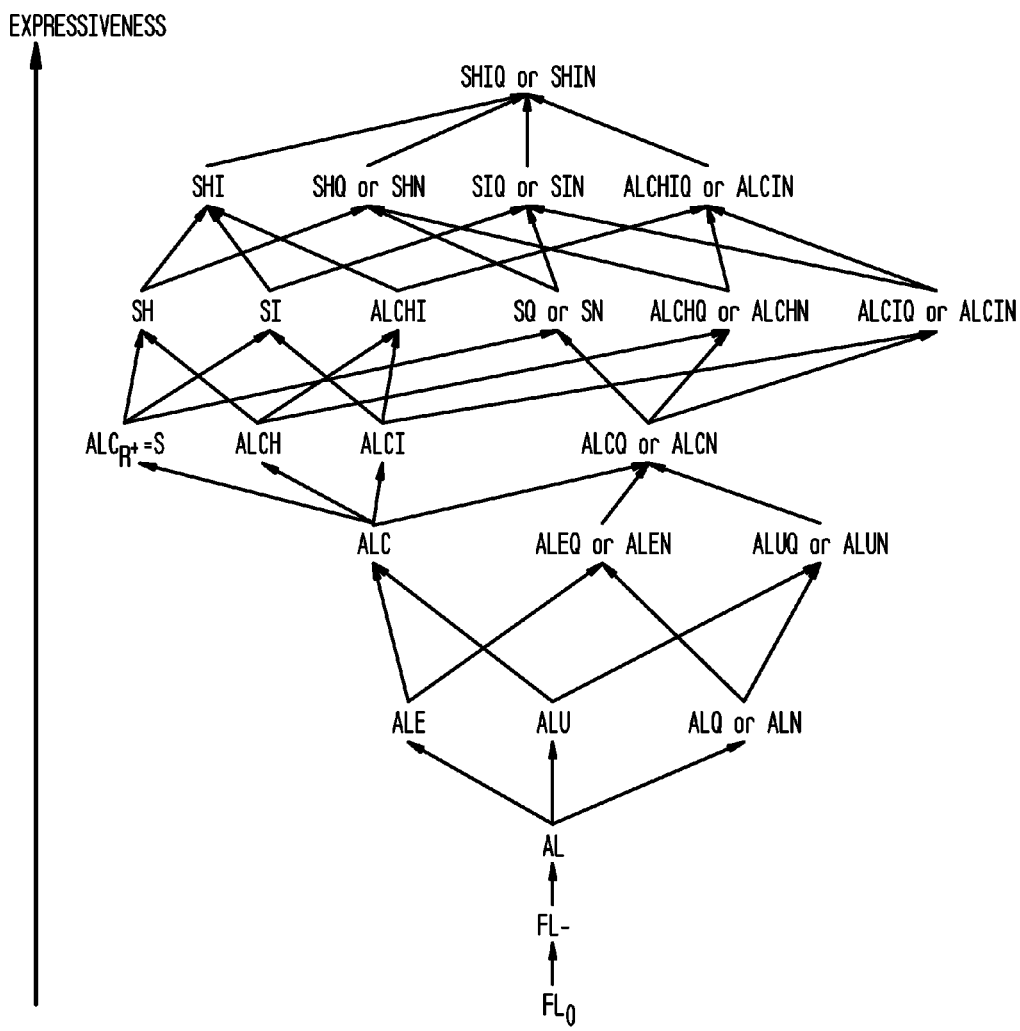
FIG. 2 graphically represents a classification tree for a family of the most-used description logics.

FIG. 2 graphically represents a classification tree for a family of the most-used description logics based on their expressiveness, which increases as you proceed up the tree. In the prior art, various DLs of varying expressiveness are used to describe data. In its simplest expression, an ontology can consist of very simple concepts interlinked by "is-a" relations.

Figure 3:
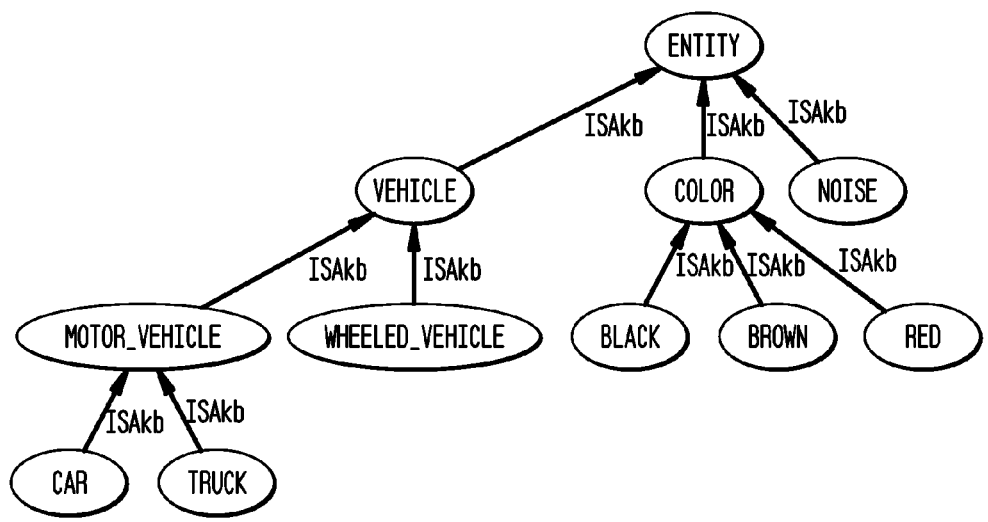
FIG. 3 graphically represents an ontology about vehicles and colors containing concepts interlinked only by "is-a" relations.

FIG. 3 graphically represents an ontology about vehicles and colors containing concepts interlinked only by "is-a" relations. Connections between concepts refer to the inclusion concept ("is-a" links represented by solid edges). This ontology is extremely simple, since it does not involve any logic constructs other than the "is-a" inclusion concept.

In the literature, different approaches have been proposed to compute the similarity of semantically described objects. They are mainly of four different categories:

(1) A path-length measure is a function of the distance between terms in the hierarchical structure underlying an ontology;

(2) A feature-matching approach uses both common and discriminating features amongst concepts and/or concept instances to compute the semantic similarity;

(3) An information-content approach defines a similarity measure for concepts within a hierarchy based on the variation of the information content conveyed by such concepts and the one conveyed by their immediate common "super-concept";

(4) A logic-based approach defines a similarity measure for concepts using their full disjunctive normal form.

The first three categories focus on either (i) the similarity of atomic concepts (in a hierarchy) rather than on composite concepts or (ii) very simple ontologies built using simple relations such as "is-a" or "part of". As a consequence, none of these first three categories can provide an accurate similarity measure with an ontology containing complex descriptions (e.g., descriptions using rich semantics such as concepts defined using logical operators). Approaches of these first three categories can be seen as adopting a "permissive approach" regarding the semantics induced by the concepts that they have to compare.

The second category can also measure the similarity between different concept instances, taking into account their properties (and not only the concepts that they belong to). Methods of this category build the semantic network of each instance that they want to analyze, based on the properties that refer to it.

Figure 4:
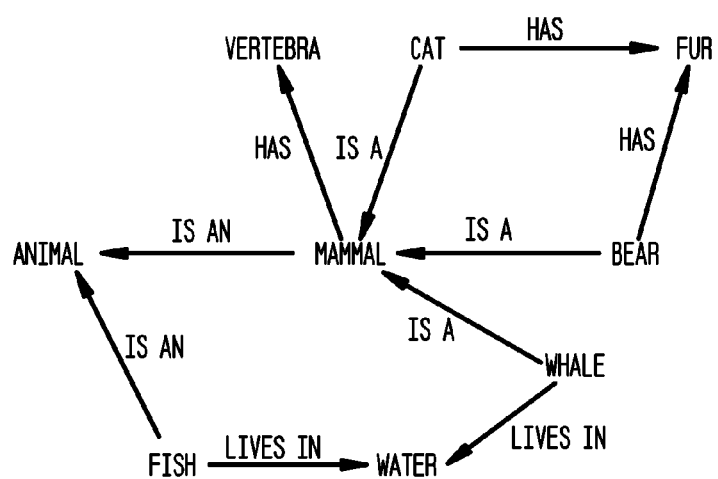
FIG. 4 graphically represents a semantic network containing not only "is-a" relationships, but also properties such as "has" or "lives in"

FIG. 4 graphically represents a semantic network containing not only "is-a" relationships, but also properties such as "has" or "lives in." Computing the similarity between different instances is done by analyzing the commonalities of their respective semantic networks.

The fourth category consists of studies that define a similarity measure based on logical constructors. Such studies allow defining a similarity function having a better accuracy than in the three other categories since such similarity function takes into account much more semantics.

In particular, some approaches of this fourth category handle the full semantics of data described by concepts defined with a DL such as SHIN, which, as depicted in FIG. 2, is a highly expressive DL. The drawback of these methods, however, is that they rely on a "too strict" approach that may lead to "false positives," e.g., logically concluding that two different objects have nothing in common while, from a human point of view, interpretation of the description of these two different objects would lead to a different conclusion.

As an example, consider the two following data describing the concept "display" of a TV and a digital photo frame, respectively, by the following sentences:

"A TV must display either a video or a photo."
"If a digital photo frame displays something, it has to be a photo."

These sentences could be formally defined, respectively, by the following equations:

$$D_a = \exists p.(A \cup B)$$

$$D_b = \forall p.A$$

with $D_a$ representing the "TV," $D_b$ representing the "digital photo frame," A representing the "photo," B representing the "video," p representing the "display" property, $\exists$ representing the existential (and mandatory) condition tied to the "TV," and $\forall$ representing the universal (but not mandatory) condition tied to the "digital photo frame."

Computing the similarity between these two structures with a formula overlooking logical constructs (such as described by Wu and Palmer, "Verb Semantics and Lexical Selection," 1994, Proceedings of the 32nd annual meeting on Association for Computational Linguistics) could lead to 0. Even if a formula is applied that does take into account all logical constructs composing $D_a$ and $D_b$ (such as described by d'Amato et al., "A Dissimilarity Measure for ALC Concept Descriptions," ACM SAC 2006), the result which is returned may again be 0. The first null value results from the fact that a TV and a digital photo frame are different concepts that are poorly hierarchically interconnected. The second null value results from the fact that, for a logic-based approach, an existential axiom (constructed with "$\exists$") is fundamentally different from a universal one (using "$\forall$"). However, from a human point of view, a digital photo frame and a TV may not be seen as completely different. Indeed, from the two aforementioned sentences, someone could argue that both can display a "photo". Designing a process able to reinterpret logical statements (e.g., able to derive some additional logical statements from existing ones) in order to integrate this point of view would then lead to proposing a non-null (and therefore refined) similarity value between a TV and a digital photo frame.

According to certain embodiments of the disclosure, a process can analyze logical constructs of very expressive ontologies to derive additional knowledge in order to lower the "strictness" of the previously mentioned approaches (in particular, those falling in the fourth category presented in the state of the art), without falling into a "too permissive" approach. The process takes an ontology as input and derives additional concepts (referred to herein as "pseudo concepts"), before applying a similarity measure. Deriving these pseudo concepts uses non-conventional reasoning mechanisms that interpret the logical axioms of some or all of the originally defined concepts. Once generated, these pseudo concepts enrich the original ontology and allow getting better results when applying an existing similarity measure.

Figure 5:
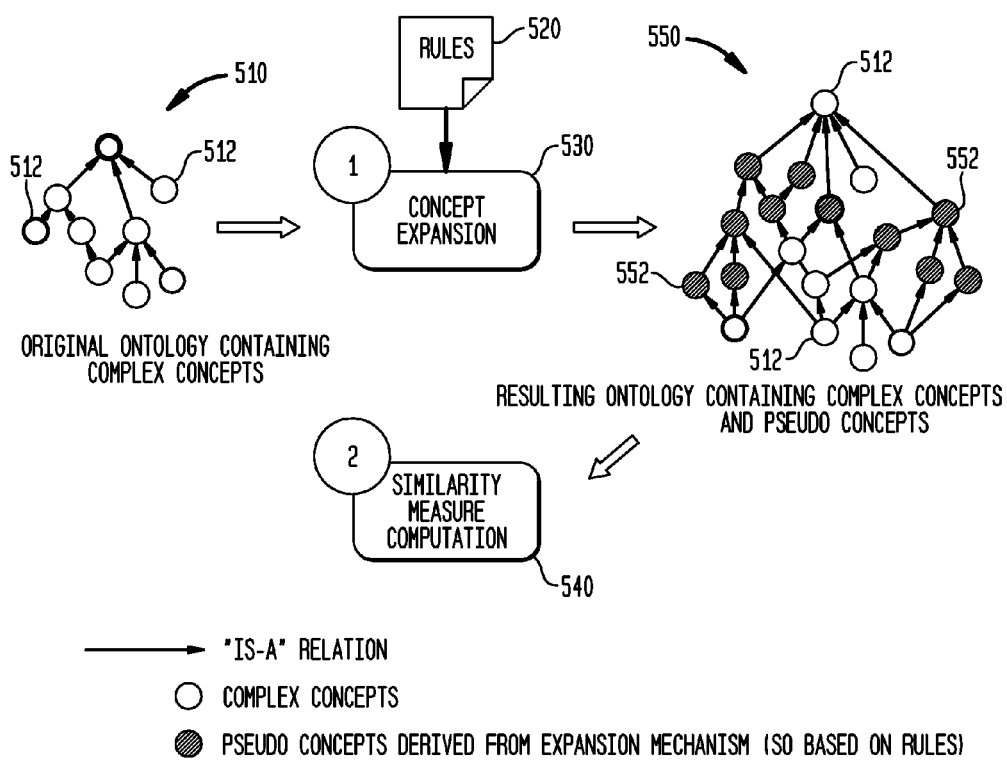
FIG. 5 shows a block diagram representing an exemplary process of the disclosure.

FIG. 5 shows a block diagram representing an exemplary process 500 of the disclosure. As shown in FIG. 5, process 500 has two main components: a concept expansion component 530 and a similarity measure computation component 540. Based on a set of rules 520, concept expansion component 530 applies non-conventional reasoning mechanisms that expand concepts (i.e., add pseudo concepts) to convert an original ontology 510 containing a set of (e.g., complex) original concepts 512 into a resulting, expanded ontology 550 containing the original concepts 512 plus a number of added pseudo concepts 552. Similarity measure computation component 540 then applies one or more similarity measures, e.g., any of the known similarity measures of the four categories described earlier, to the expanded ontology 550 to characterize the similarity between two or more different concepts in the ontology.

Figure 6:
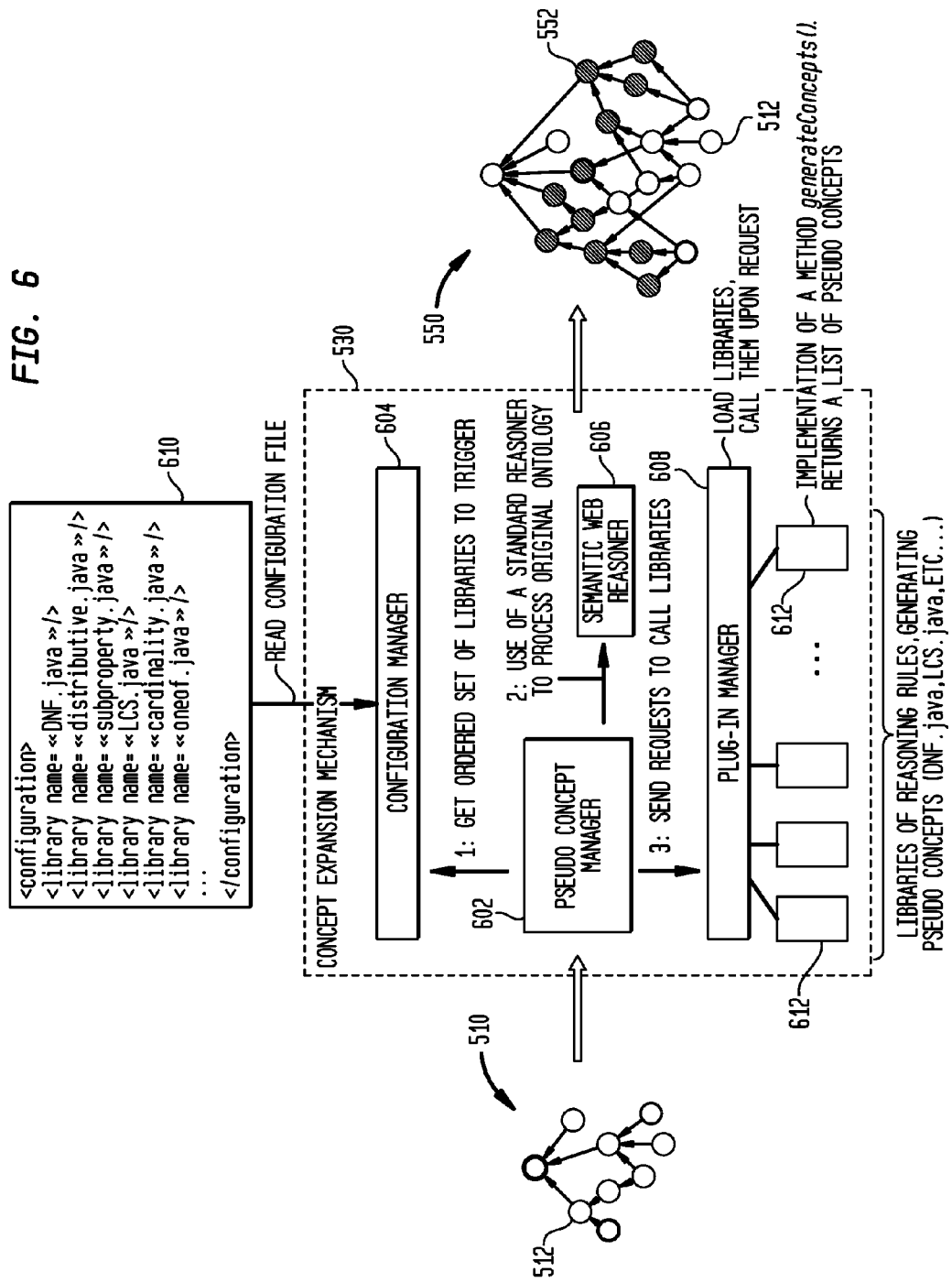
FIG. 6 shows a block diagram representing one possible implementation of the concept expansion component of FIG. 5.

FIG. 6 shows a block diagram representing one possible implementation of concept expansion component 530 of FIG. 5. Consistent with FIG. 5, concept expansion component 530 receives original ontology 510 and generates expanded ontology 550. At the heart of concept expansion component 530 is pseudo concept manager 602, which relies on processing calls to configuration manager 604, semantic web reasoner 606, and plug-in manager 608.

Configuration manager 604 reads a configuration file 610 containing the different reasoning mechanisms that are sequentially called to generate pseudo concepts 552. In particular, configuration file 610 is read by configuration manager 604 to get the list of reasoning processes to be applied by pseudo concept manager 602. In one implementation, these reasoning processes are encoded in Java libraries 612 that are accessed by plug-in manager 608, which allows the addition of new reasoning processes, resulting in a highly configurable and extensible process. This implementation considers that rules are encoded in plug-ins that can be called by pseudo concept manager 602. Configuration file 610 defines the list of functions and in which order the related plug-ins are to be called, hence making the whole process highly customizable and updatable with new reasoning rule libraries 612 by modifying configuration file 610.

Once the list of reasoning processes is obtained by configuration manager 604 from configuration file 610, pseudo concept manager 602 starts calling (e.g., standard) semantic web reasoner 606 (such as HermiT, see http://www.hermitreasoner.com/) in order to get an in-memory representation of the original ontology 510. Pseudo concept manager 602 uses this in-memory representation to pass the original concepts 512 to the different reasoning libraries 612 to generate new pseudo concepts 552. The one or more pseudo concepts 552 generated by a given library 612 are added to the in-memory representation before the next library 612 is invoked. As such, previously generated pseudo concepts can participate in the generation of subsequent pseudo concepts.

FIG. 7 presents pseudo code for one possible implementation of pseudo concept manager 602 (lines 1-18) and plug-in manager 608 (lines 19-23) of FIG. 6, where lines 2-4 represent an initialization phase of pseudo concept manager 602 and lines 5-18 represent a processing phase of pseudo concept manager 602.

Plug-in manager 608 defines a process of calling into a particular library 612 of reasoning rules with a current in-memory representation (O) of the ontology having (i) the original concepts 512 and, if this is not the first library call, (ii) possibly one or more pseudo concepts 552 from previous library calls. The result of a library call can be (but does not necessarily have to be) a set (PS[ ]) containing one or more new pseudo concepts 552.

In the initialization phase of pseudo concept manager 602, line 3 represents pseudo concept manager 602 calling into semantic web reasoner 606 with the original ontology 510 to receive the in-memory representation O of that original ontology. Line 4 represents pseudo concept manager 602 calling into configuration manager 604 to get from configuration file 610 the set of reasoning rules to apply (LIBS[ ]).

In the processing phase of pseudo concept manager 602, lines 7-17 represent a loop through the different libraries 612 containing the reasoning rules in LIBS[ ] received from configuration manager 604. Line 9 represents pseudo concept manager 602 requesting plug-in manager 608 to make a call into a particular library 612 with the current in-line memory representation O to receive a set (PS[ ]) of zero, one, or more new pseudo concepts (PS). If, in line 10, the set PS[ ] is not empty, then, in lines 12-15, for each new pseudo concept PS in the set PS[ ], pseudo concept manager 602 requests semantic web reasoner 606 to add the new pseudo concept PS to the existing in-memory representation O of the ontology to generate an updated in-memory representation O of the ontology having the new pseudo concept PS in addition to the original concepts and any previously added pseudo concepts. At the completion of the loop through the different libraries 612, the final in-memory representation O corresponds to expanded ontology 550.

Possible implementations of concept expansion component 530 result in one or more of the following operations:

(1) Semantic web reasoner 606 is a standard semantic web reasoner that applies conventional reasoning processes to the logical expression defining each concept in the original ontology 510 in order to create in-memory representation of the ontology and apply OWL reasoning to infer relations between the in-memory representation of these concepts (mainly, it classifies the ontology).

(2) At least one of the libraries 612 is implemented as a disjunctive normal form (DNF) reasoning process library that performs the following:

(a) Rewrite the logical expression of a concept in negative normal form (NNF) then in disjunctive normal form (DNF).

(b) Assuming that this DNF contains N (>1) disjuncts that are not atomic concepts, create N new pseudo concepts (1 disjunct=1 new pseudo concept).

(c) For each pseudo concept previously created, check if it is formed by a set of conjuncts. If so, then create a new pseudo concept for each existing conjunct.

(3) A least common subsumer (LCS) reasoning process computes the LCSs of all pair-wise disjoint concepts and pseudo-concepts. Assuming M LCSs have been computed, M new pseudo concepts are created.

(4) Newly created pseudo concepts (up to now, N+M pseudo concepts have been generated) are re-injected in the in-memory representation of the ontology by the semantic web reasoner 606. Then the pseudo concept manager 602 applies non-conventional reasoning processes (as described below) by calling sequentially other libraries 612 through plug-in manager 608 to determine what can be derived from the updated ontology. Assuming that P derivations have been determined, another P pseudo concepts are generated.

(5) With the ontology containing both the original concepts and the N+M+P new pseudo concepts, a semantic engine, such as semantic web reasoner 606, is used to reclassify all of the concepts. Reclassification refers to a re-computation of the inclusion relations that exist between the original concepts and the new pseudo concepts of the expanded ontology.

Non-Conventional Reasoning Rules

Step (4) above uses non-conventional reasoning procedures but is based on a pure logic approach, not used by a standard semantic web engine. Implementation of such reasoning mechanisms can be found on the Web and can therefore be adapted to fit into concept expansion component 530 of FIGS. 5 and 6. By integrating these procedures, some pseudo concepts are generated in a novel way.

The following is a non-exhaustive list of procedures that fit into this category:

Distributing union and intersection operators over existential and universal restrictions. In particular, considering the following rules:

R1: $\exists R.(C_1 \cup C_2 \ldots \cup C_n) = \exists R.(C_1) \cup \exists R.(C_2) \ldots \cup \exists R.(C_n)$ R2: $\forall R.(C_1 \cap C_2 \ldots \cap C_n) = \forall R.(C_1) \cap \forall R.(C_2) \ldots \cap \forall R.(C_n)$ R3: $\forall R.(C_1 \cup C_2 \ldots \cup C_n)$ contains $\forall R.(C_1) \cup \exists R.(C_2) \ldots \cup \exists R.(C_n)$ R4: $\exists R.(C_1 \cap C_2 \ldots \cap C_n)$ is contained by $\exists R.(C_1) \cap \forall R.(C_2) \ldots \cap \exists R.(C_n)$ Distributing union and intersection operators over cardinality restrictions. In particular, considering the following rules:

R5: $\geq nR.(C_1 \cup C_2 \ldots \cup C_n)$ contains $\geq nR.(C_1) \cup \geq nR.(C_2) \ldots \cup \geq nR.(C_n)$ R6: $\leq nR.(C_1 \cup C_2 \ldots \cup C_n)$ is contained by $\leq nR.(C_1) \cup \leq nR.(C_2) \ldots \cup \leq nR.(C_n)$ R7: $\leq nR.(C_1 \cap C_2 \ldots \cap C_n)$ contains $\leq nR.(C_1) \cap \leq nR.(C_2) \ldots \cap \leq nR.(C_n)$ R8: $\geq nR.(C_1 \cap C_2 \ldots \cap C_n)$ is contained by $\geq nR.(C_1) \cap \geq nR.(C_2) \ldots \cap \geq nR.(C_n)$ Indeed, distributive rules can also be applied for cardinality restrictions in logical expressions to generate new pseudo concepts. This results from some inclusion properties that exist when distributing union and intersection operators on qualified minimum or maximum cardinalities. In this context, a cardinality restriction puts constraints on the number of values a property can take, in the context of a particular concept description. For example, for a soccer team, the "hasPlayer" property has 11 values. For a basketball team, the same property would have only 5 values.

Use of super-properties in order to deduce less strict concepts. For example, if a concept has the property "has brother," then a similar pseudo concept could be created but with the property "has sibling" instead, assuming that the ontology contains the fact that "has brother" entails "has sibling". In particular, the following rules are used to generate pseudo-concepts:

R9: $\exists R.C$ is contained by $\exists S.C$ if and only if S is a superproperty of R R10: $\forall R.C$ is contained by $\forall S.C$ if and only if S is a superproperty of R R11: $\geq nR.C$ is contained by $\geq nS.C$ if and only if S is a superproperty of R R12: $\leq nR.C$ is contained by $\leq nS.C$ if and only if S is a superproperty of R In more details, for any logical expression of a given concept appearing in the in-memory representation of the ontology, rules (such as the aforementioned 12, from R1 to R12) are triggered to generate pseudo-concepts. As an example, in the case of a logical expression representing the following concept $C \equiv \exists R.(C_1 \cap C_2 \cap \ldots C_n)$ the rule R3 is applied and the following set of pseudo-concepts is generated: $\{\exists R.C_1, \exists R.C_2, \ldots \exists R.C_n\}$ (hence, n pseudo-concepts). Moreover, supposing it exists S a super property of R, the rule R9 is applied to C and the additional pseudo-concept $\exists S.C$ is generated.

Figure 8:
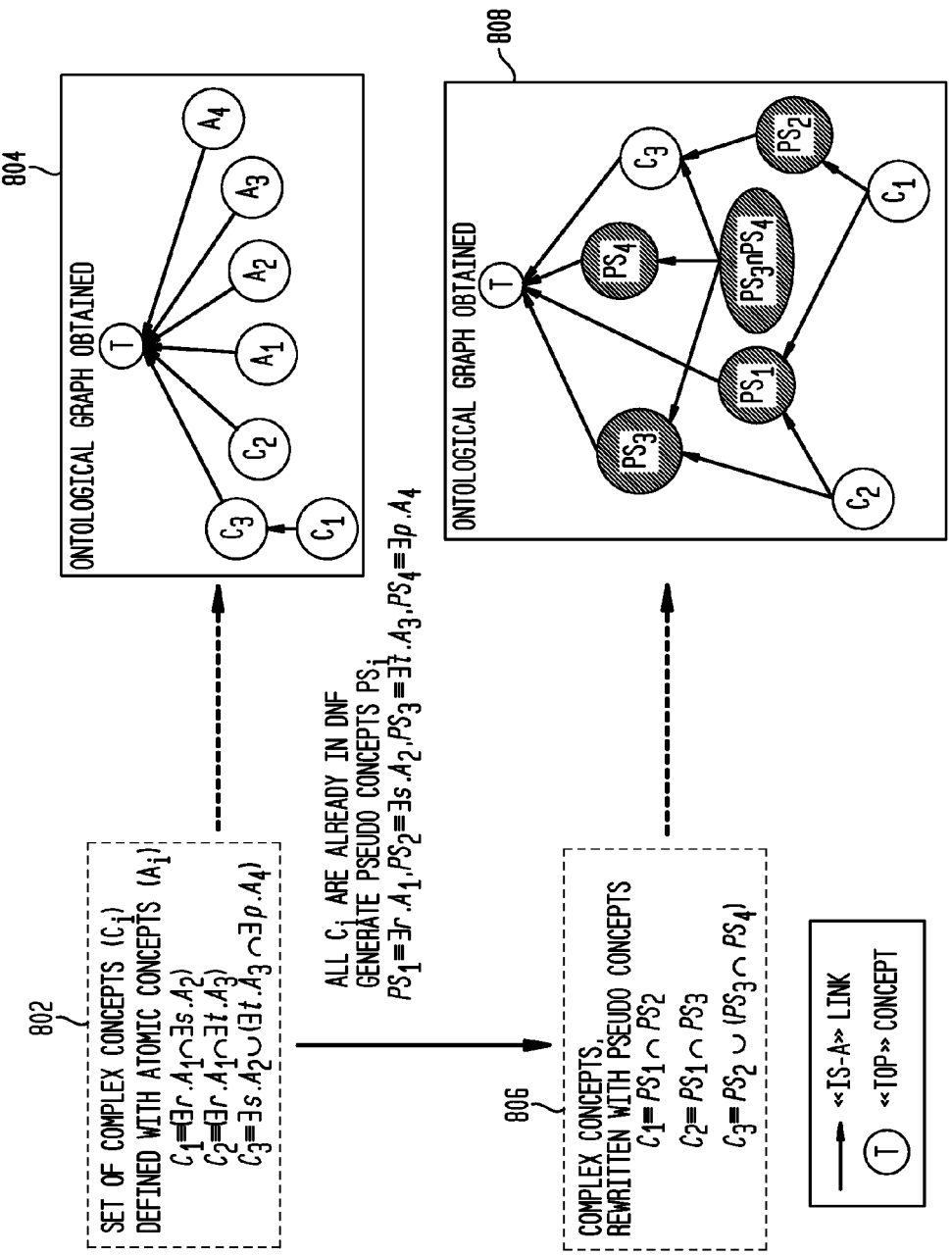

FIG. 8 shows a block diagram of an exemplary implementation of Step (2)(b) listed above, in which, following the analysis of the expressions composing complex concepts $C_i$ written in DNF, a new pseudo concept $PS_i$ in set 806 is generated for each disjunct in set 802. In this example, the generation of pseudo concepts refines the least common subsumer of concepts $C_1$ and $C_2$. In particular, in the first diagram 804, the least common subsumer was the "top" concept T, while, in the second diagram 808, the least common subsumer is the pseudo concept $PS_1$. This allows having a more-refined similarity measure than those merely based on concept hierarchy and not on full semantics.

FIG. 9 shows a block diagram of Step (2)(b) followed by the application of distributive rules R1 to R4 to generate additional pseudo concepts, as compared to solely rewriting complex concepts in DNF as in FIG. 8. Note that, in this example, no pseudo concepts are generated from concept D by Step (2)(b). Distributive rules R1 to R4 are then applied for the existential restrictions on the expressions resulting from Step-(2)(b) to generate additional pseudo concepts. This technique can find better least common subsumers to different concepts (here $PS_{12}$ or $PS_{21}$ are the best candidates).

The following presents a non-exhaustive list of rules that can be included in concept expansion component 530. These rules typically integrate human assumptions (for instance, learned from surveys, etc.) and include at least the following:

Using a closed world assumption (CWA) to derive more information on a concept represented in OWL (Web Ontology Language) format, even if OWL format is based on an open world assumption. In particular, a reasoning process can reduce a concept to all its known instances (i.e., known in the original ontology); and Deriving a universal clause from an existential one.

FIG. 10 shows a block diagram of an exemplary implementation of Step (4) listed above, which uses other non-conventional rules plus additional strong assumptions that a standard semantic web engine would never use, to generate additional pseudo concepts. Step (4) may be based on the assumption that an ontology representing data is "complete" and that closed world assumption (CWA) reasoning can be applied. In this particular example, deriving knowledge based on CWA assumptions (typically the kind of assumptions a human may have) leads to an additional "is-a" relation between Child and Girl, hence strengthening the similarity between these two concepts.

The processing of FIG. 10 works as follows: If it is inferred that two concepts have a non-null intersection, and that one of these two concepts has all its members into this intersection, then its definition is modified to assert that this concept is (e.g., exactly) equivalent to all its known members. The result is that the modified concept becomes a sub-class of the other one, while, before, they were just two different concepts with a non-null intersection. The consequence is the creation of a new "is-a" relation that may have impact on the similarity computed.

By integrating the generation of pseudo concepts of component 530 with the computation of similarity measurements of component 540, process 500 of FIG. 5 provides a different approach than other similarity measures. Because the resulting expanded ontology 550 can contain many more "is-a" relationships than the original ontology 510 (e.g., due to DNF decomposition and/or to non-conventional reasoning), similarity measure computation component 540 can apply a "hierarchical"-based similarity measure to compute a similarity between all concepts disjoint pair-wise. Indeed, such measure uses the common "superconcept" (aka subsumer) of the two concepts being compared and hence takes advantage of the additional "is-a" relationships.

In the specific case of ontologies underlied by the Description Logic ALCHOQ or ALCHQ, a way to realize the process of concept expansion consists of implementing an algorithm doing the following steps.

1) Applying circumscription rules to supposedly "closed" concepts in order to rewrite them (the term "closed concept" is defined hereafter);

2) Rewriting original concepts and those having been circumscribed (by previous step 1) based on an ALCHOQ Normal Form (defined hereafter); and 3) Applying a Rewrite procedure together with rules generating pseudo-concepts (described hereafter) on the ALCHOQ Normal Form of each concept of the original ontology.

In details, the first step results from the fact that, when formally capturing intuitions of the domain of an application (e.g., medicine, telecommunications, banking, etc.), many applications adhere to a Local Closed World Assumption (LCWA), meaning that, for some statements, the lack of proving that they are true entails that they are false. This viewpoint is particularly strengthened in the case of an ontology built using a bottom-up approach, where some described elements of a particular domain of interest are selected by an engineer, and where these descriptions are further generalized into a concept description.

In many cases, such concepts are assumed by the engineer (i) to be "closed" and (ii) to adhere to LCWA. Such form of reasoning is however non-monotonic and consequently is not supported by OWL reasoners that are based on the Open World Assumption, i.e., where any deduction must be the consequence of (i) a contradiction involving known facts of a Knowledge Base (the in-memory representation of an ontology) and (ii) the negation of this deduction. Expressed differently, any statement that does not lead a semantic reasoner to a contradiction cannot be added to the Knowledge Base.

In the case of an ontology containing LCWA, i.e., concepts supposed as "closed", this difference of vision may result in a gap between the deductions computed by an OWL reasoner and what was expected by the engineer having designed the ontology. An underlying consequence of this gap of deductions is that the gap may impact semantic similarity measurements, especially in the case of approaches based on ontological structures (e.g., using hierarchy of concepts or semantic networks). Towards this aim, logical circumscription can be applied in order to minimize the extensions of any assumed "closed" concept to a list of known individuals asserted in the ontology.

To this prospect, the following rules circumscribe all assumed "closed" concepts by adding an "equivalent class" axiom in the ontology. A further entailment of these rules is the deduction of an additional subsumption relation. Each of these rules analyses whether a set of axioms can be found in the ontology and, in such a case, enrich it with axioms "closing" (from OWA point of view) the description of involved concepts.

In these rules, we suppose that "A", "X", "Y", and "Z" are original concepts of the ontology, while "R" is a role (i.e., a property linking two or more concepts, such as in the TV and photo frame example presented previously, and where one of the roles is the "display" property). In these rules, "a" is an individual belonging to the concept "A", written as "a∈A$^I$" (e.g., "Mary" belongs to the concept "Woman"). I is defined as the interpretation of the ontology and consists of a non-empty set $\Delta^I$ called the domain of interpretation and of an interpretation function $\bullet^I$, mapping (i) each concept C to a set of instances $C^I$, such that $C^I$ is contained by $\Delta^I$, and (ii) each role R to a set $R^I$, such that $R^I$ is contained by ($\Delta^I \times \Delta^I$).

The first proposed rule checks the concepts defined or subsumed by a qualified value restriction (e.g., C contained by $\forall R.D$). This rule can be written as follow:

$$R_1: \frac{(X \sqsubseteq \forall R.Y) \bigwedge \begin{pmatrix} \phi \subset Z^I \subseteq \{z \in Z^I \mid \\ \exists x \in X^I \wedge (x, z) \in R^I\} \end{pmatrix}}{Z^I \equiv \{z \in Z^I \mid \exists x \in C^I \wedge (x, z) \in R^I\}}$$

In this rule, X is subsumed by a qualified value restriction (involving R and Y). If it can be asserted that all elements of a known concept (here, all known z, such that z belongs to $Z^I$) are linked with at least one individual of X by the relation R, then an axiom circumscribing the definition of such Z to its elements is added in the Knowledge Base.

The second proposed rule checks the concepts defined or subsumed by an object value restriction (e.g., C contained by $\forall R.a$). This rule can be written as follow:

$$R_2: \frac{(X \sqsubseteq \forall R.a) \bigwedge (\{y \in Y^I \mid y \subseteq \neg a\} = \phi) \bigwedge \begin{pmatrix} \phi \subset Y^I \subseteq \{y \in Y^I \mid \\ \exists x \in X^I \wedge (x, y) \in R^I\} \end{pmatrix}}{Y^I \equiv \{a\}}$$

The second rule assumes that there is a concept (here X) which is subsumed by an object value restriction involving the role R and the individual a. What the rule needs to check is the existence of some known concept (here Y) verifying two conditions:

All members of this concept (i.e., all y such that y∈$Y^I$) must be linked to at least one individual of X by the relation R, and For all elements of this concept, the ontology must not contain an assertion stating that it is different from a.

If both conditions are met, then this second rule adds an axiom in the ontology that circumscripts the definition of Y to the single individual a. As a consequence, Y is subsumed by A ($Y^I$ is contained by $A^I$).

Note that this first step is not restricted to ontologies underlied with ALCHQ or ALCHOQ DLs.

The second step of the algorithm is based on rewriting the concepts in ALCHOQ Normal Form, which is defined as follow. A concept $C_D$ is in ALCHOQ Normal Form if and only if $C_D \equiv D_1 \cup \ldots \cup D_n$ such that:

$$D_i = Prim(D_i) \cap Nom(D_i) \cap \left( \bigcap_{R \in N_R} Rest(R, D_i) \right),$$

where:

$N_R$ is the set of all roles of the original ontology,

Prim(C) the intersection of all (negated) primitive concepts at the top level of C, Nom(C) the intersection of all (negated) nominals at the top level of C, Rest(R,C)=Exist(R,C)⊓ Univ(R,C)⊓ AtLeast(R,C) ⊓ AtMost(R,C)⊓ Exactly(R,C) with Exist(R,C)=$\cap_{C' \in ex(R,C)} \exists R.C'$, with ex(R, C) being the set of all C' such that ∃R.C' appears at the top-level of C (C' is a singleton in the case of ∃R.a restrictions, "a" being an individual).

Univ(R,C)=∀R.val(R,C), with val(R,C) being the conjunction $C_1 \sqcap \ldots \sqcap C_n$ in the value restriction of role R (here again, $C_i$ is a singleton in the case of ∀R.a restrictions, with "a" being an individual).

AtLeast(R,C)=$\cap_{C' \in al(R,C)} (\geq n_{max}$ R.C'), with al(R,C) being the set of all C' such that (≥nR.C') appears at the top-level of C and with $n_{max}$ being the highest n if more than one minimal cardinality exist for the same C'.

AtMost(R,C)=$\cap_{C' \in am(R,C)} (\leq n_{min} R.C')$, with am(R,C) being the set of all C' such that (≤nR.C') appears at the top-level of C and with $n_{min}$ being the smallest n if more than one minimal cardinality exist for the same C'.

Exactly(R,C)=$\cap_{C' \in exact(R,C)} (=n$ R.C'), with exact(R,C) being the set of all C' such that (=n R.C') appears at the top-level of C.

Any sub-description C' in ex(R,C), al(R,C), am(R,C), or exact(R,C) and any $C_i \in val(R,C)$ is in Normal Form except if such C' has already been rewritten (allow handling cyclic definitions of concepts such that C=∃R.C).

Finally, the last step of the algorithm consists of working on each concept written in ALCHOQ Normal Form and is defined as follows:

For each concept $C_D$ of the ontology and written in ALCHOQ Normal Form, a set PS of pseudo concepts of $C_D$ is initialized such that PS={$D_i$} with $C_D = \cup_i D_i$. The set is then expanded by applying, on each of its elements, a Rewrite procedure (composed of 13 rules, from R.1 to R.13) followed by 14 pseudo concept generation rules (from P.1 to P.14). The algorithm terminates when all elements of PS have been checked and returns the expanded set PS.

For a pseudo concept C∈PS, the Rewrite procedure is based on 12 rewriting rules applied in order of appearance. The procedure is defined as follows:

Procedure Rewrite:
- R.1: If the definition of C contains a union of two (or more) sets of nominals ($\{c_1, \ldots, c_n\} \cup \{d_1 \ldots d_n\}$), then merge the sets into one set of nominals $\{c_1, \ldots, c_n, d_1, \ldots, d_n\}$.
- R.2: If the definition of C contains intersections of nominals, then rewrite these intersections to a new set of nominals containing elements that appear in each of the intersected sets.
- R.3: If the definition of C contains ($\geq n$ R.D $\sqcap \geq m$ S.D) with $n \geq m$ and $R \subseteq S$ (i.e., R is a sub-property of S), then remove $\geq m$ S.D from C.
- R.4: If the definition of C contains ($\leq n$ S.D $\sqcap \leq m$ R.D) with $n \leq m$ and $R \subseteq S$, then remove $\leq m$ R.D from C.
- R.5: If the definition of C contains ($\geq n$ R.D $\sqcup \geq m$ S.D) with $n \geq m$ and $R \subseteq S$, then remove $\geq n$ R.D from C.
- R.6: If the definition of C contains ($\leq n$ S.D $\sqcup \leq m$ R.D) with $n \leq m$ and $R \subseteq S$, then remove $\leq n$ S.D from C.
- R.7: If $C = (\exists R.(\cup_i C_i))$, then apply rewrite on each $C_i$ and rewrite C such that $C = \cup_i (\exists R.C_i)$.
- R.8: If $C = (\forall R.(\cap_i C_i))$, then apply rewrite on each $C_i$ and rewrite C such that $C = \cap_i (\forall R.C_i)$.
- R.9: If $C = (\exists R.D)$ such that D is an existential, universal, or cardinality restriction, then apply Rewrite on D, apply the generative rules P8-P11 on D and if one of these rules may generate a pseudo-concept (say E), then $\exists R.E$ is added to the list of pseudo-concepts PS.
- R.10: If $C = (\forall R.D)$ such that D is an existential, universal or cardinality restriction, the apply Rewrite on D, apply the generative rules P10-P14 on D, and, if one of these rules generates a pseudo-concept (say E), then $\forall R.E$ is added to the list of pseudo-concepts PS.
- R.11: If $C = (\leq n\ R.D)$ such that D is an existential, universal, or cardinality restriction, then apply Rewrite on D, apply the generative rules P10-P14 on D, and, if one of these rules generates a pseudo-concept (say E), then $\leq n$ R.E is added to the list of pseudo-concepts PS.
- R.12: If $C = (\geq n\ R.D)$ such that D is an existential, universal, or cardinality restriction, then apply Rewrite on D, apply the generative rules P10-P14 on D, and, if one of these rules generates a pseudo-concept (say E), then $\geq n$ R.E is added to the list of pseudo-concepts PS.
- R.13: If $C = (= n\ R.D)$ such that D is an existential, universal, or cardinality restriction, then apply Rewrite on D, apply the generative rules P10-P14 on D, and, if one of these rules generates a pseudo-concept (say E), then $= n$ R.E is added to the list of pseudo-concepts PS.

Then, the following generation rules are applied on C:
- P.1: If $C = (\cap_i C_i)$, then add all $C_i$ to PS that are not already in the original ontology.
- P.2: If $C = (\cup R.(\cup_i C_i))$, then add $\forall R.C_i$ to PS.
- P.3: If $C = (\geq n\ R.(\cup_i C_i))$, then add all $\geq n$ R.($C_i$) to PS.
- P.4: If $C = (\leq n\ R.(\cup_i C_i))$, then add all $\leq n$ R.($C_i$) to PS.
- P.5: If $C = (= n\ R.(\cup_i C_i))$, then add all $= n$ R.($C_i$) to PS.
- P.6: If $C = (\exists R.(\cap_i C_i))$, then add $\exists R.C_i$ to PS.
- P.7: If $C = (\geq n\ R.(\cap_i C_i))$, then add all $\geq n$ R.($C_i$) to PS.
- P.8: If $C = (\leq n\ R.(\cap_i C_i))$, then add all $\leq n$ R.($C_i$) to PS.
- P.9: If $C = (= n\ R.(\cap_i C_i))$, then add all $= n$ R.($C_i$) to PS.
- P.10: If $C = (\exists R.D)$ for some R being a sub-property of S, then add ($\exists$ S.D) to PS.
- P.11: If $C = (\forall R.D)$ for some R being a sub-property of S, then add ($\forall$ S.D) to PS.
- P.12: If $C = (\geq n\ R.D)$ for some R being a sub-property of S, then add ($\geq n$ S.D) to PS.
- P.13: If $C = (\leq n\ S.D)$ for some R being a sub-property of S, then add ($\leq n$ R.D) to PS.
- P.14: If $C = (= n\ R.D)$ for some R being a sub-property of S, then add ($= n$ S.D) to PS.

The result of this algorithm is the generation of a set of pseudo-concepts (PS) that is further inserted in the original ontology to apply conventional similarity measures.

Although the disclosure has been described in the context of a process that computes a similarity measure after performing concept expansion on an original ontology, there may be other contexts in which concept expansion may be applied.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A machine-implemented method comprising:
    (a) the machine receiving an original ontology containing a plurality of original concepts; and
    (b) the machine applying a concept expansion mechanism to the original ontology to generate an expanded ontology containing the original concepts and one or more pseudo concepts, wherein step (b) comprises:
        (b1) generating an in-memory representation for the original ontology;
        (b2) using one or more libraries of reasoning rules to generate the one or more pseudo concepts; and
        (b3) incorporating the one or more pseudo concepts into the in-memory representation.

2. The method of claim 1, further comprising:
    (c) the machine applying a similarity measure computation to the expanded ontology to characterize similarity between at least two concepts in the expanded ontology.

3. The method of claim 1, wherein step (b) further comprises retrieving a list of the reasoning rules from a configuration file.

4. The method of claim 3, further comprising modifying the configuration file to enable retrieval of a different list of the reasoning rules.

5. The method of claim 1, wherein step (b1) comprises using a semantic web reasoner to generate the in-memory representation for the original ontology.

6. The method of claim 1, wherein, for at least one library of reasoning rules:
    step (b2) comprises applying a current in-memory representation corresponding to an ontology containing the original concepts and one or more previously added pseudo concepts to the library to generate one or more new pseudo concepts; and
    step (b3) comprises adding the one or more new pseudo concepts to the current in-memory representation to generate an updated in-memory representation containing the original concepts, the one or more previously added pseudo concepts, and the one or more new pseudo concepts.

7. The method of claim 6, wherein step (b3) comprises using a semantic web reasoner to sequentially add each of the one or more new pseudo concepts to the current in-memory representation.

8. A machine-implemented method comprising:
    (a) the machine receiving an original ontology containing a plurality of original concepts; and
    (b) the machine applying a concept expansion mechanism to the original ontology to generate an expanded ontology containing the original concepts and one or more pseudo concepts, wherein step (b) comprises applying at least one non-conventional reasoning process to a logical expression for a concept to generate at least one new pseudo concept.

9. The method of claim 8, wherein step (b) comprises using a semantic web reasoner to generate the logical expression for the at least one new pseudo concept.

10. The method of claim 8, wherein the at least one non-conventional reasoning process (i) rewrites the logical expression for the concept in negative normal form and then in disjunctive normal form and (ii) generates a first new pseudo concept for at least one disjunct in the logical expression written in the disjunctive normal form.

11. The method of claim 10, wherein the at least one non-conventional reasoning process (iii) generates a second new pseudo concept for at least one conjunct used to generate the first new pseudo concept.

12. The method of claim 8, wherein the at least one non-conventional reasoning process (i) uses least common subsumer reasoning to determine a least common subsumer of at least one pair-wise disjoint concept and (ii) generates a new pseudo concept for the least common subsumer.

13. The method of claim 8, wherein the at least one non-conventional reasoning process uses super-properties of the logical expression in order to deduce a new pseudo concept as a less-strict concept.

14. The method of claim 8, wherein the at least one non-conventional reasoning process applies one or more distributive rules for one or more existential restrictions in the logical expression to generate a new pseudo concept.

15. The method of claim 8, wherein the at least one non-conventional reasoning process applies one or more distributive rules for one or more universal restrictions in the logical expression to generate a new pseudo concept.

16. The method of claim 8, wherein the at least one non-conventional reasoning process applies one or more distributive rules for one or more cardinality restrictions in the logical expression to generate a new pseudo concept.

17. The method of claim 8, wherein the at least one non-conventional reasoning process applies a closed world assumption to the logical expression to generate a new pseudo concept.

18. The method of claim 17, wherein, if the concept has (i) a non-null intersection with another concept and (ii) all its members into this intersection, then the concept's definition is modified to assert that the concept is equivalent to all its members.

19. The method of claim 8, wherein the at least one non-conventional reasoning process derives a universal clause from an existential clause in the logical expression to generate a new pseudo concept.

20. The method of claim 8, further comprising:
(c) the machine applying a similarity measure computation to the expanded ontology to characterize similarity between at least two concepts in the expanded ontology.

21. A machine comprising:
an input node configured to receive an original ontology containing a plurality of original concepts; and
a concept expansion mechanism configured to apply concept expansion the original ontology to generate an expanded ontology containing the original concepts and one or more pseudo concepts, wherein the concept expansion mechanism applies at least one non-conventional reasoning process to a logical expression for a concept to generate at least one new pseudo concept.

* * * * *